United States Patent
Crissey

(10) Patent No.: US 7,427,587 B2
(45) Date of Patent: Sep. 23, 2008

(54) POLISHING COMPOUND

(76) Inventor: Gordon K. Crissey, P.O. Box 453, Gregory, TX (US) 78359

( * ) Notice: Subject to any disclaimer, the term of this patent is extended or adjusted under 35 U.S.C. 154(b) by 480 days.

(21) Appl. No.: 11/157,773

(22) Filed: Jun. 20, 2005

(65) Prior Publication Data

US 2006/0283094 A1    Dec. 21, 2006

(51) Int. Cl.
  *C11D 7/50* (2006.01)
(52) U.S. Cl. .................. 510/403; 51/307; 51/308; 106/3; 106/8; 510/396
(58) Field of Classification Search .............. 510/396, 510/403; 51/307, 308; 106/3, 8
See application file for complete search history.

(56) References Cited

U.S. PATENT DOCUMENTS

| | | | | |
|---|---|---|---|---|
| 1,965,299 A | * | 7/1934 | Patterson | 51/304 |
| 2,136,402 A | * | 11/1938 | Tumbler | 106/4 |
| 2,289,392 A | * | 7/1942 | Tumbler | 106/9 |
| 2,335,324 A | * | 11/1943 | Tumbler | 106/7 |
| 2,399,205 A | * | 4/1946 | Campbell | 134/26 |
| 2,949,374 A | * | 8/1960 | Kendall | 106/10 |
| 3,544,498 A | * | 12/1970 | Thimineur et al. | 524/588 |
| 4,308,060 A | | 12/1981 | Talbot | |
| 4,853,000 A | | 8/1989 | Potter | |
| 4,952,240 A | | 8/1990 | Smith | |
| 5,141,555 A | | 8/1992 | Elepano | |
| 5,258,063 A | * | 11/1993 | Cifuentes et al. | 106/3 |
| 5,462,688 A | * | 10/1995 | Lippman et al. | 510/139 |
| 5,523,014 A | * | 6/1996 | Dolan et al. | 510/396 |
| 5,968,238 A | * | 10/1999 | Healy et al. | 106/3 |
| 6,172,025 B1 | | 1/2001 | Johnson | |
| 6,425,929 B1 | * | 7/2002 | Naney | 51/308 |

* cited by examiner

*Primary Examiner*—Gregory E Webb
(74) *Attorney, Agent, or Firm*—G. Turner Moller

(57) ABSTRACT

A cleaning and polishing composition contains mineral spirits, a first abrasive component of particles having a median size in a range of 1-4 microns, a second abrasive component of particles having a median size in a range of 15-30 microns and a fatty acid. The composition is a free flowing liquid having the viscosity of mineral spirits and has the ability to provide a long lasting finish. After cleaning and polishing an aluminum surface and after several weeks of rough use, the surface may be washed and looks like a newly polished surface. A preferred composition is 85-90% mineral spirits, balance stearic acid and aluminum oxide. The median particle size of the abrasive is less than about six microns and a sizeable fraction is below one micron.

10 Claims, 1 Drawing Sheet

POLISHING COMPOUND

This invention relates to a polishing compound and more particularly to a polishing compound especially suited to polish aluminum but also effective in polishing plastics, painted surfaces and other metals.

BACKGROUND OF THE INVENTION

There are many prior art cleaning and polishing compositions, because there is a desire to keep metal, plastic and painted surfaces clean, shiny and rust free. Almost all of these compositions include abrasive materials designed to gently remove adherent films and the like from the surface being polished or cleaned. Prior art cleaning and polishing compositions have a variety of limitations. Specifically, most polishes tend to be limited in the type of surfaces they are usable on and tend to be effective for only limited times.

Disclosures of some interest relative to this invention are found in U.S. Pat. Nos. 4,308,060; 4,853,000; 4,952,240; 5,141,555; 6,172,025 and 6,425,929.

SUMMARY OF THE INVENTION

In this invention, a fine abrasive powder and a coarser abrasive powder are mixed with a fatty acid and mineral spirits to provide a free flowing liquid polishing composition that essentially has the viscosity of mineral spirits. A tell tale characteristic of the polishing composition of this invention is the ability to polish aluminum and, after two or three weeks, washing the aluminum with water to produce a shiny appearance, as if the aluminum had just been polished. Even after several months, the aluminum washes to a generally clean appearance. The duration of a polished appearance increases substantially with repeated polishing, i.e. the polished appearance lasts longer after a second application of the material of this invention.

The polishing composition of this invention is useful on many different metals, such as chrome plated steel, aluminum alloys, stainless steel and the like as well as plastics, such as LEXAN, clear coatings, fiberglass and painted surfaces. Although the polishing composition is abrasive enough to remove adherent film on many surfaces, it will not visibly scratch painted surfaces. This is likely attributed to the fact that the abrasive material has a bimodal particle diameter distribution with a first median diameter in the range of 1-4 microns and a second median diameter in the range of about 15-30 microns. The overall median particle diameter is less than about six microns. In addition, in a preferred material, a substantial portion of the powdered material is less than about one micron.

In use, the liquid polishing composition of this invention is applied with a suitable applicator, such as a clean thin cotton rag, preferably a thin red shop rag. A thin red cotton shop rag cuts polishing time and effort and ensures removal of stains and water spots. It is often more difficult to remove stains and water spots from many metals using a thick or soft cotton rag. Sometimes, stains and water spots will not come off aluminum or brass unless a thin red shop rag is used.

The polishing composition is generously applied to the rag and wiped onto the surface being cleaned, rubbing moderately. After allowing the composition to sit on the surface for a short time to soak into dirt and oxidation, it is again rubbed moderately with the same wet rag. Soon, a haze appears on the surface as the polishing compound dries. This haze is removed with a clean dry towel for polished results. Repeating the short soaking time on extensively damaged metals gives progressively better results after each moderate rubbing to achieve a polished mirror or chrome like appearance. Whether the haze is dark or light depends on the material of the surface being polished.

It is an object of this invention to provide an improved polishing compound including a mineral spirits carrier, an abrasive having a bimodal particle diameter distribution and a fatty acid.

A further object of this invention is to provide an improved polishing compound that is particularly suited to polish aluminum and create a long lived polished surface.

Another object of this invention is to provide an improved polishing compound that is suitable for many metals, plastics as well as painted surfaces.

A more specific object of this invention is to provide a preferred polishing compound that is a free flowing liquid comprising a large fraction of mineral spirits and a minor fraction of aluminum oxide and a fatty acid.

These and other objects and advantages of this invention will become more apparent as this description proceeds, reference being made to the accompanying drawings and appended claims.

DETAILED DESCRIPTION

Figure 1:
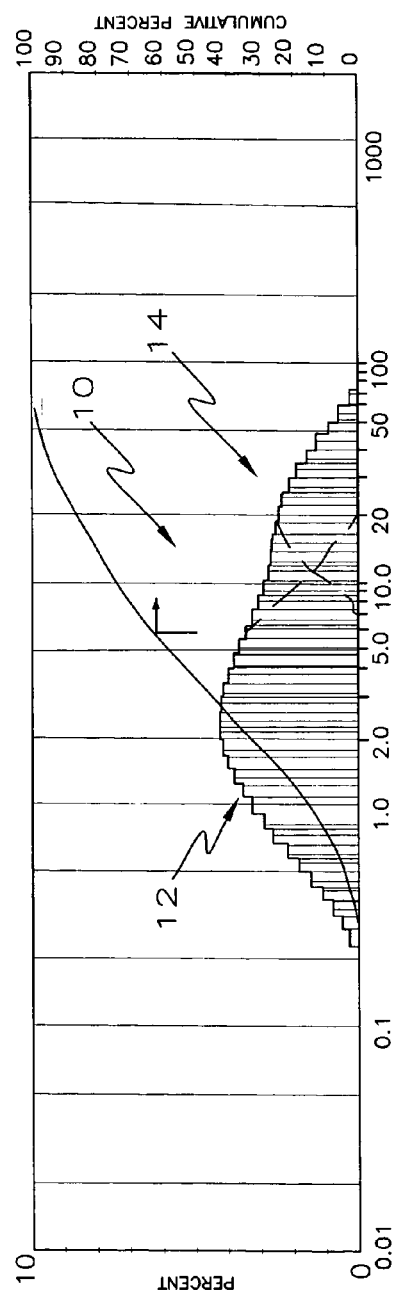
FIG. 1 is a graph showing the particle diameter distribution of the abrasive material.

The polishing compound of this invention comprises a volatile organic carrier of which mineral spirits is much preferred, a first fine abrasive powder, a second coarser abrasive powder, and a fatty acid that is soluble in the organic carrier.

Mineral spirits is a commodity of commerce and is available from a variety of sources such as Exxon Corporation under the tradename ISOPAR G. Mineral spirits is generally known as a middle petroleum distillate of predominately $C_{14}$-$C_{18}$ isoparaffinic hydrocarbons having a typical boiling point of about 495-625° F., a specific gravity of about 0.82, a vapor pressure of 0.15 mm Hg @ 77° F. and is a clear water white liquid that is essentially odorless. As will be explained hereinafter, the mineral spirits component of this invention is in the range of 80-95% by weight of the composition. Above 95% by weight mineral spirits, there is not enough abrasive material or fatty acid to be very effective. Below 80% by weight mineral spirits, it is difficult to keep the solids component dispersed in the mineral spirits. In a preferred formulation, there is about 85-90% by weight mineral spirits and, in an optimum formulation, there is about 85-88% by weight mineral spirits.

The abrasive is selected from the group consisting essentially of iron oxide, aluminum oxide and chromium oxide and is preferably aluminum oxide. The abrasive material comes in at least two populations. A first group is finely ground and has a median particle diameter in the range of 1-4 microns, preferably about 2 microns. A second group is coarser and has a median particle diameter in the range of 15-30 microns, preferably about 20 microns. The first group is more numerous than the second group, so the median particle diameter of both populations is less than six and preferably is in the range of 3-5 microns. In addition, the abrasive preferably has a sizeable fraction of particles less than about one micron, preferably at least about ten percent and ideally at least about fifteen percent. In an optimum formulation, the median particle diameter is less than 4 microns and about 15% of particles, by volume, are greater than 1 micron.

The abrasive or polishing component of this invention make up the majority of the solids component. Preferably, the amount of abrasive component is above 50% and ideally is above 65% by weight of the solids component of the composition of this invention. The polishing compound of this invention can tolerate a small amount of impurities, such as calcium carbonate, magnesium carbonate and the like which are commonly found in commercial abrasive compositions. Typically, these type impurities amount to less than 5% by weight and preferably are below 3% by weight.

Many saturated and unsaturated fatty acids are suitable for use in this invention such as stearic acid, butyric acid, lauric acid, myristic acid, palmitic acid, arachidic acid, alphalineolic acid, lineolic acid, oleic acid, erucic acid and the like. The requirements are that the fatty acid be soluble in the organic carrier, i.e. mineral spirits, and have the capability of helping to prolong the effectiveness of the polishing operation. One of the unusual and unpredicted effects of this invention, as well as a defining characteristic, is that cleaning and polishing an aluminum surface provides relatively long lasting results. An aluminum surface cleaned and polished with the composition of this invention can be washed several weeks, i.e. two or three weeks, later and the surface appears to be freshly polished, i.e. have a shiny like new appearance. Without being bound by any theory, it is believed that the fatty acid and/or the amorphous chromium oxide of this invention form a more-or-less tenacious film on the cleaned aluminum surface. When the surface is washed after several weeks, any normal grime is washed away leaving an aluminum surface of relatively like new appearance. This is surprising because one would think that rain would wash off the water soluble fatty acid so that any long duration effect would not survive rainfall. This has been shown not to be the case.

The amount of fatty acid may vary considerably from about 20% by weight to about 50% by weight of the solids component. Above 50% by weight, there is not enough abrasive. Below 20% by weight, there is not enough fatty acid. Preferably, the fatty acid is in the range of 25-35% by weight. The preferred fatty acid is stearic acid.

EXAMPLE 1

In a preferred formulation, four ounces of a mixture of stearic acid (27.5% by weight), aluminum oxide (68.3% by weight), chromium oxide (1.1% by weight) balance miscellaneous oxides, chlorides and carbonates is obtained from a manufacturer. This material is received as a solid. It is roughly ground in a suitable manner, such as with a hand operated meat grinder, passed through a large mesh screen or colander and then mixed with 31 liquid ounces of mineral spirits. The 31 liquid ounces of mineral spirits weighs about 27.1 ounces so the liquid component amounts to about 87% of the total. In a quart bottle, the mixture is allowed to set to digest the stearic acid in the mineral spirits. No heating is required. After a few hours, there is a greenish residue in the bottom of the bottle. Before applying, the bottle is shaken to disperse the greenish residue. Although it is convenient to obtain the solid starting material from a manufacturer, the components may be acquired separately and mixed together.

The non-organic portion of this mixture has a particle size distribution as follows:

TABLE I

| size microns | volume or mass under % |
|---|---|
| .196 | 0.00 |
| .217 | 0.02 |
| .239 | 0.07 |
| .290 | 0.51 |
| .320 | 0.88 |
| .353 | 1.37 |
| .389 | 2.00 |
| .429 | 2.78 |
| .473 | 3.70 |
| .522 | 4.78 |
| .576 | 6.02 |
| .635 | 7.40 |
| .700 | 8.96 |
| .772 | 10.70 |
| .851 | 12.56 |
| .938 | 14.55 |
| 1.03 | 16.67 |
| 1.14 | 18.91 |
| 1.26 | 21.27 |
| 1.39 | 23.73 |
| 1.53 | 26.28 |
| 1.69 | 28.90 |
| 1.86 | 31.57 |
| 2.05 | 34.30 |
| 2.26 | 37.04 |
| 2.49 | 39.80 |
| 2.75 | 42.54 |
| 3.03 | 45.27 |
| 3.34 | 47.96 |
| 3.69 | 50.61 |
| 4.07 | 53.20 |
| 4.48 | 55.73 |
| 4.94 | 58.20 |
| 5.45 | 60.59 |
| 6.01 | 62.91 |
| 6.63 | 65.16 |
| 7.31 | 67.33 |
| 8.06 | 69.43 |
| 9.80 | 73.44 |
| 10.81 | 75.34 |
| 11.91 | 77.18 |
| 13.14 | 78.98 |
| 14.49 | 80.76 |
| 15.97 | 82.50 |
| 17.62 | 84.21 |
| 19.42 | 85.89 |
| 21.42 | 87.53 |
| 23.62 | 89.12 |
| 26.04 | 90.65 |
| 28.72 | 92.10 |
| 31.66 | 93.46 |
| 34.92 | 94.72 |
| 38.50 | 95.86 |
| 42.45 | 96.87 |
| 46.81 | 97.74 |
| 51.62 | 98.47 |
| 56.92 | 99.06 |
| 62.76 | 99.50 |
| 69.21 | 99.84 |
| 76.32 | 100.00 |

To obtain this information about particle size distribution, a sample of the product from the manufacturer was obtained. The stearic acid was dissolved in a solution of 2% lecithin in ISOPAR G, a mineral spirit available from Exxon-Mobil Corporation, and the remaining solids were analyzed on a MALVERN Mastersizer S LASER diffractor according to standard operating procedures on this type instrument by Particle Technology Labs, Ltd, of Downers Grove, Ill.

FIG. 1 is a histogram 10 showing the distribution of the non-organic particles and is a graphic representation of Table I. Table I and FIG. 1 reveal an unusual situation. If the larger particles in the non-organic component of this invention were more numerous and abrasive, there should be visible scratches on many surfaces with which this invention has been used. No scratches have been seen on diverse surfaces, including paint. The conclusion must be that the large particles are not abrasive or that their absolute numbers are rather small and that the smaller particles, which are much more numerous, rework any scratches so they are not visible with the naked eye.

On inspection under a 100× or a 400× microscope, the larger particles are of two types: (1) the largest number are a dark amorphous material in transmitted light but which are white in reflected light or (2) a much smaller number of clear or colorless crystals. The clear or colorless crystals were found, by scanning electronmicroscopy with energy dispersive x-ray spectrometry, to be calcium rich. Further analysis of the larger colorless crystals by infrared microspectroscopy identified them as calcium carbonate.

The whitish/brownish amorphous lumps were found to contain aluminum and oxygen but no organic material, indicating that they are aluminum oxide or aluminum hydroxide. The whitish/brownish amorphous particles showed no significant absorption in the mid-infrared region, which is consistent with aluminum oxide.

Figure 2:
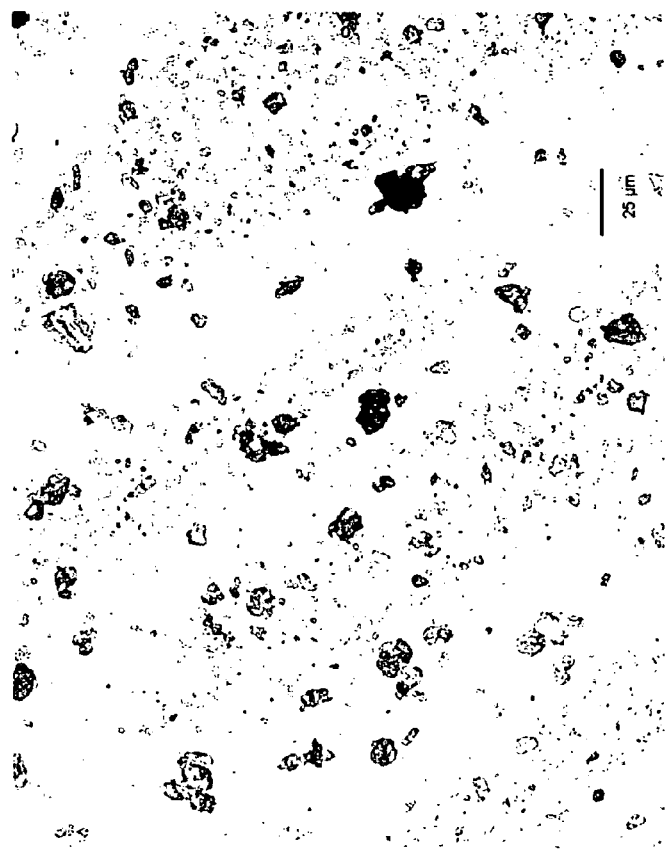
FIG. 2 is a drawing representation of a 400× microphotograph showing a dispersion of the polishing compound of this invention.

FIG. 2 is a drawing representation of a 400× microphotograph of a dispersion of the polishing compound of this invention. The majority of the larger particles are aluminum oxide and the minority are calcium carbonate. Without being bound by any theory, it is believed that the longevity of the polish of this invention is due to the cooperation of the mixture of large and small abrasive particles with the fatty acid component.

Viewing the data from Table I and the histogram 10 of FIG. 1 in this light, the histogram 10 shows two populations: a population 12 comprising small abrasive $Al_2O_3$ particles and a population 14 of relatively large abrasive aluminum oxide particles and non-abrasive calcium carbonate particles. It is estimated that these larger particles comprise about 10-30% by volume of the total sample of non-organic solids. It is believed that the large calcium carbonate particles are not themselves abrasive. The large abrasive aluminum oxide particles are present in rather small absolute numbers, meaning that any visible scratches produced by the larger particles are obscured by the finer particles. Thus, the large particles do not produce visible scratches in the surfaces being polished as would a polishing compound containing all large abrasive particles. It will be evident, however, that the large abrasive particles contribute significantly to the ability of the polishing compound of this invention to cut adherent films on the substrates being polished.

This cleaning and polishing composition was used to clean and polish an aluminum saddle tank of an 18 wheel type truck. The composition was applied to a clean rag and wiped onto the tank, rubbing moderately. After allowing it to sit for a one to three minutes, the mineral spirits largely evaporated and the remaining composition was rubbed. Shortly, a black haze appeared. The black haze was rubbed moderately again with the same wet polishing rag to obtain the polishing results from wet soaking during the short drying time. This soaking process was repeated three times to achieve a mirror or chrome like shine. The dry black haze was then removed with a clean dry towel. After several weeks, the truck and saddle tank were washed. From a distance, the saddle tank appeared to be freshly polished.

This cleaning and polishing composition was used to clean a LEXAN headlight lens on a vehicle that had failed an annual inspection because of the lack of brightness from the headlights. Within ten minutes, the headlights were polished to a clear shine and, thirty minutes later, the vehicle passed inspection.

This cleaning and polishing composition was used to clean a commercial stainless steel kitchen side surface. Prior to cleaning, the surface was spattered with cooking oil and/or grease and would not pass inspection by a city health inspector. After cleaning, the side surface was clean and shiny.

A whitewall motorcycle tire was over forty years old and had yellowed with age and/or exposure to sunlight. After twice applying and rubbing off the preferred cleaning and polishing compound of this invention, the yellowing whitewall became white.

A white residue from a conventional car polish was on a blackwall tire. The residue was removed by applying the preferred composition of this invention to the area, rubbing and allowing it to dry to a white haze. The white haze was removed with mineral spirits.

A black polishing residue appeared on a painted automobile surface. The residue was cleaned by applying the preferred composition of this invention, allowing it to sit a short while and then rubbing it. The residue was removed and the painted surface was not scratched.

A 1976 model AIRSTREAM trailer, having an aluminum skin, was in bad shape because it had not be waxed or otherwise surface cleaned in many years. The oxidized outer surface was clean with BIX stripper. The preferred composition of this invention was applied with a clean rag, allowed to sit for a minute or two, and then polished with an electric buffer and then buffed by hand. The polished area shined. After cleaning the entire vehicle, it appeared to be years younger.

EXAMPLE 2

Four ounces of a mixture of oleic acid (45% by weight) and chromium oxide (55% by weight) are mixed with 28 liquid ounces of mineral spirits. The 28 liquid ounces of mineral spirits weighs about 24.5 ounces so the liquid component amounts to about 86% of the total. The median diameter of the small abrasive particles is about four microns. About 12% of the abrasive particles are below one micron. The median diameter of the larger particles is about 18 microns.

EXAMPLE 3

Three ounces of a 50-50 mixture of stearic acid and lineolic acid (35% by weight) and iron oxide (63% by weight) and chrome oxide (2% by weight) are mixed with 31 ounces of mineral spirits. The 31 ounces of mineral spirits weighs about 27.1 ounces so the liquid component amounts to about 90% of the total. The median size of the small abrasive component of the composition is about three microns. About 14% of the abrasive particles are below one micron. The median size of the larger particles is about 20 microns. The overall median size of the abrasive particles is about 4 microns.

EXAMPLE 4

Five ounces of a mixture of stearic acid (20% by weight) and aluminum oxide (79% by weight) and chrome oxide (1% by weight) are mixed with 25 ounces of mineral spirits. The 25 ounces of mineral spirits weighs about 21.9 ounces so the liquid component amounts to about 81% of the total. The median particle size of the small component is about 2 microns. The median particle size of the large component is about 22 microns. The overall median particle size is about 5 microns.

EXAMPLE 5

Five ounces of a mixture of palmitic acid (50% by weight) and aluminum oxide (48% by weight) and chrome oxide (2% by weight) are mixed with 25 ounces of mineral spirits. The 25 ounces of mineral spirits weighs about 21.9 ounces so the liquid component amounts to about 81% of the total. The median size of the small abrasive component is about 2 microns. The median size of the large particles is about 15 microns. The overall median size is about 4 microns.

Although this invention has been disclosed and described in its preferred forms with a certain degree of particularity, it is understood that the present disclosure of the preferred forms is only by way of example and that numerous changes in the types of fatty acids and types of abrasives as well as the percentages thereof may be resorted to without departing from the spirit and scope of the invention as hereinafter claimed.

I claim:

1. A cleaning and polishing composition, consisting essentially of about 80-90% by weight mineral spirits, balance being a solid component of
   about 20-50% by weight fatty acid; and
   a first abrasive component of at least 65% by volume abrasive particles having a median particle size less than about four microns,
   a second abrasive component of 10-35% by volume abrasive particles having a median particle size of at least than about ten microns;
   the median overall particle size being less than about six microns,
   the composition, when agitated to disperse the solid component in the mineral spirits, being a free flowing liquid having a viscosity substantially that of the mineral spirits,
   the composition having the ability to polish aluminum and, after several weeks, of being washed with water to produce a shiny like new appearance, the composition being free of flour.

2. The cleaning and polishing composition of claim 1 wherein the fatty acid is stearic acid.

3. The cleaning and polishing composition of claim 1 wherein the abrasive component is selected from the group consisting of iron oxide, chromium oxide and aluminum oxide.

4. The cleaning and polishing composition of claim 3 wherein the fatty acid is selected from the group consisting of stearic acid, butyric acid, lauric acid, myristic acid, palmitic acid, arachidic acid, alphalineolic acid, lineolic acid, oleic acid, erucic acid.

5. The cleaning and polishing composition of claim 1 wherein at least ten percent by weight of the polishing component has a particle size less than about one micron.

6. The cleaning and polishing composition of claim 1 wherein the fatty acid is stearic acid and the abrasive component is mainly aluminum oxide.

7. The cleaning and polishing composition of claim 6 wherein the solid component is about 25-35% by weight stearic acid and at least 65% by weight aluminum oxide.

8. The cleaning and polishing composition of claim 7 wherein the polishing component includes about 1% by weight chromium oxide.

9. A cleaning and polishing composition, consisting essentially of about 85-90% by weight mineral spirits, balance being a solid component of
   about 25-35% by weight stearic acid; and
   a first small abrasive component of aluminum oxide having a median particle size less than about four microns and having at least ten percent of particles being less than about one micron,
   a second large abrasive component of having a median particle size of 15-30 microns,
   the composition, when agitated to disperse the solid component in the mineral spirits, being a free flowing liquid having a viscosity substantially that of the mineral spirits,
   the composition having the ability to polish aluminum and, after several weeks, of being washed with water to produce a shiny like new appearance.

10. The cleaning and polishing composition of claim 9 wherein the mineral spirits component is about 85-88% by weight of the composition.

* * * * *